(12) United States Patent
Hamilton, II et al.

(10) Patent No.: US 10,721,334 B2
(45) Date of Patent: Jul. 21, 2020

(54) TRIGGER EVENT BASED DATA FEED OF VIRTUAL UNIVERSE DATA

(71) Applicant: International Business Machines Corporation, Armonk, NY (US)

(72) Inventors: Rick A. Hamilton, II, Charlottesville, VA (US); James R. Kozloski, New Fairfield, CT (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 15/015,853

(22) Filed: Feb. 4, 2016

(65) Prior Publication Data

US 2016/0156740 A1    Jun. 2, 2016

Related U.S. Application Data

(63) Continuation of application No. 12/120,629, filed on May 14, 2008, now Pat. No. 9,268,454.

(51) Int. Cl.
*H04L 29/06* (2006.01)
*G06F 16/958* (2019.01)
(Continued)

(52) U.S. Cl.
CPC ............ *H04L 67/38* (2013.01); *G06F 3/0481* (2013.01); *G06F 9/453* (2018.02); *G06F 16/958* (2019.01);
(Continued)

(58) Field of Classification Search
CPC ......... G06F 3/481; G06F 9/451; H04L 67/06; H04L 67/38
See application file for complete search history.

(56) References Cited

U.S. PATENT DOCUMENTS 4,807,202 A    2/1989  Cherri et al.
4,984,179 A    1/1991  Waldern
(Continued)

FOREIGN PATENT DOCUMENTS

WO    WO9509411    4/1995

OTHER PUBLICATIONS

U.S. Appl. No. 60/979,584 (Written Description only) (Year: 2007).*
(Continued)

*Primary Examiner* — Eric J. Bycer
(74) *Attorney, Agent, or Firm* — Christopher M. Pignato

(57) ABSTRACT

Disclosed herein is a system and method for data collection in a virtual universe. The system can determine a first virtual universe object in a virtual universe comprises a first data source for a first data feed. The system can determine a first trigger event associated with the first data source. The system can determine permission has been granted to access the first data feed. The system can in response to determining permission has been granted to access the first data feed: determine to capture first data from the first data feed in response to a second virtual universe object performing the first trigger event; determine to create a first data feed file comprising the first data and first information related to the second virtual universe object; and determine to transmit the first data feed file to a user device associated with the first virtual universe object.

18 Claims, 7 Drawing Sheets

(51) Int. Cl.
   *G06F 9/451*   (2018.01)
   *G06F 3/0481*  (2013.01)
   *H04L 29/08*   (2006.01)
   *G07F 17/32*   (2006.01)
   *A63F 13/30*   (2014.01)
   *G06Q 30/02*   (2012.01)

(52) U.S. Cl.
   CPC .............. *H04L 67/06* (2013.01); *A63F 13/30* (2014.09); *A63F 2300/5553* (2013.01); *G06F 9/451* (2018.02); *G06Q 30/02* (2013.01); *G07F 17/323* (2013.01); *H04L 29/06034* (2013.01); *H04L 29/0809* (2013.01); *H04L 67/02* (2013.01)

(56) References Cited

U.S. PATENT DOCUMENTS

| | | | |
|---|---|---|---|
| 5,177,872 | A | 1/1993 | Lewis et al. |
| 5,815,586 | A | 9/1998 | Dobbins |
| 6,020,885 | A | 2/2000 | Honda |
| 6,085,256 | A | 7/2000 | Kitano et al. |
| 6,229,533 | B1 | 5/2001 | Farmer et al. |
| 6,281,898 | B1 | 8/2001 | Nikolovska et al. |
| 6,366,285 | B1 * | 4/2002 | Brush, II .............. G06F 3/011 345/473 |
| 6,396,509 | B1 | 5/2002 | Cheng et al. |
| 6,452,598 | B1 | 9/2002 | Rafey et al. |
| 6,518,989 | B1 | 2/2003 | Ishikawa |
| 6,704,784 | B2 | 3/2004 | Matsuda et al. |
| 7,036,082 | B1 | 4/2006 | Dalrympie et al. |
| 7,065,553 | B1 * | 6/2006 | Chesley .............. A63F 13/12 345/418 |
| 7,184,038 | B2 | 2/2007 | Sowizral et al. |
| 7,266,616 | B1 | 9/2007 | Munshi et al. |
| 7,801,956 | B1 | 9/2010 | Cumberbatch et al. |
| 2002/0113809 | A1 | 8/2002 | Akazawa et al. |
| 2003/0005439 | A1 | 1/2003 | Rovira |
| 2003/0177187 | A1 | 9/2003 | Levine et al. |
| 2003/0187749 | A1 | 10/2003 | Peled et al. |
| 2004/0116183 | A1 | 6/2004 | Prindle |
| 2004/0193441 | A1 | 9/2004 | Altieri |
| 2005/0143174 | A1 | 6/2005 | Goldman et al. |
| 2005/0166163 | A1 | 7/2005 | Chang et al. |
| 2005/0179685 | A1 | 8/2005 | Kake et al. |
| 2005/0193341 | A1 | 9/2005 | Hayward et al. |
| 2006/0121991 | A1 | 6/2006 | Borinik et al. |
| 2006/0129917 | A1 | 6/2006 | Volk et al. |
| 2006/0135261 | A1 | 6/2006 | Kinne et al. |
| 2006/0173985 | A1 | 8/2006 | Moore |
| 2007/0113181 | A1 | 5/2007 | Blattner et al. |
| 2007/0174467 | A1 | 7/2007 | Ballou, Jr. et al. |
| 2007/0192352 | A1 | 8/2007 | Levy |
| 2007/0192674 | A1 | 8/2007 | Bodin et al. |
| 2007/0209011 | A1 | 9/2007 | Padmanabhuni et al. |
| 2007/0220016 | A1 | 9/2007 | Estrada et al. |
| 2007/0225071 | A1 | 9/2007 | Van Luchene et al. |
| 2007/0255807 | A1 | 11/2007 | Hayashi et al. |
| 2007/0265090 | A1 | 11/2007 | Barsness et al. |
| 2007/0265091 | A1 | 11/2007 | Aguilar, Jr. et al. |
| 2008/0059348 | A1 | 3/2008 | Glassman et al. |
| 2008/0059570 | A1 | 3/2008 | Bill |
| 2008/0090659 | A1 | 4/2008 | Aguilar et al. |
| 2008/0194332 | A1 | 8/2008 | Kadikario et al. |
| 2008/0200253 | A1 | 8/2008 | Van Luchene et al. |
| 2008/0207329 | A1 | 8/2008 | Wallace et al. |
| 2008/0248849 | A1 | 10/2008 | Lutnick et al. |
| 2008/0270319 | A1 | 10/2008 | Torabi et al. |
| 2008/0284779 | A1 | 11/2008 | Gu et al. |
| 2008/0306951 | A1 | 12/2008 | Rodefer |
| 2008/0318678 | A1 | 12/2008 | Stivoric et al. |
| 2009/0007186 | A1 | 1/2009 | Hartwell |
| 2009/0017913 | A1 | 1/2009 | Bell et al. |
| 2009/0024943 | A1 | 1/2009 | Adler et al. |
| 2009/0069084 | A1 | 3/2009 | Reece et al. |
| 2009/0094287 | A1 | 4/2009 | Johnson et al. |
| 2009/0100353 | A1 | 4/2009 | Cradick et al. |
| 2009/0109213 | A1 | 4/2009 | Hamilton, II et al. |
| 2009/0112970 | A1 | 4/2009 | Dawson et al. |
| 2009/0124349 | A1 | 5/2009 | Dawson et al. |
| 2009/0132422 | A1 | 5/2009 | Booth |
| 2009/0138906 | A1 | 5/2009 | Eide et al. |
| 2009/0144267 | A1 | 6/2009 | Cook et al. |
| 2009/0144639 | A1 | 6/2009 | Nims et al. |
| 2009/0147003 | A1 | 6/2009 | Do et al. |
| 2009/0158161 | A1 | 6/2009 | Gibbs et al. |
| 2009/0164279 | A1 | 6/2009 | Black et al. |
| 2009/0172570 | A1 | 7/2009 | Arcas et al. |
| 2009/0209335 | A1 | 8/2009 | Pearce |
| 2009/0215433 | A1 | 8/2009 | Cavanaugh et al. |
| 2009/0241039 | A1 | 9/2009 | Estevez et al. |
| 2009/0241126 | A1 | 9/2009 | Beggs et al. |
| 2009/0287758 | A1 | 11/2009 | Hamilton, II et al. |
| 2009/0288001 | A1 | 11/2009 | Hamilton, II et al. |
| 2009/0319892 | A1 | 12/2009 | Wright et al. |
| 2010/0005424 | A1 | 1/2010 | Sundaresan et al. |

OTHER PUBLICATIONS

USPTO Memorandum re: Dynamic Drinkware and Amgen (Year: 2018).*
"Animal Crossing Wild World: Instruction Booklet for Nintendo DS", Nintendo, 2005, 24 pages.
"U.S. Appl. No. 11/877,875 Final Office Action", dated Apr. 14, 2011, 15 pages.
"U.S. Appl. No. 11/877,875 Office Action", dated Oct. 12, 2010, 12 pages.
"U.S. Appl. No. 12/120,625 Final Office Action", dated Feb. 24, 2012, 22 pages.
"U.S. Appl. No. 12/120,625 Final Office Action", dated Aug. 9, 2010, 14 pages.
"U.S. Appl. No. 12/120,625 Office Action", dated Apr. 6, 2011, 20 pages.
"U.S. Appl. No. 12/120,625 Office Action", dated Dec. 28, 2009, 13 pages.
"U.S. Appl. No. 12/120,629 Final Office Action", dated Mar. 14, 2012, 23 pages.
"U.S. Appl. No. 12/120,629 Final Office Action", dated Mar. 29, 2011, 33 pages.
"U.S. Appl. No. 12/120,629 Office Action", dated Oct. 6, 2011, 32 pages.
"U.S. Appl. No. 12/120,629 Office Action", dated Dec. 13, 2010, 27 pages.
"What is RSS?", Software Garden, Jul. 6, 2004, 2 pages.
Dudeney, "Streaming RSS Feeds in World", Sep. 24, 2006, 3 Pages.

* cited by examiner

TRIGGER EVENT BASED DATA FEED OF VIRTUAL UNIVERSE DATA

RELATED APPLICATIONS

This application is a Continuation of and claims the priority benefit of United States of America application Ser. No. 12/120,629 filed May 14, 2008, now U.S. Pat. No. 9,268,454.

BACKGROUND

Embodiments of the inventive subject matter generally relate to the field of virtual universe systems, and more particularly, to creating trigger events based web data feeds of virtual universe avatar data.

Virtual universe applications allow people to socialize and interact in a virtual universe. A virtual universe (VU) is a computer-based simulated environment intended for its residents to traverse, inhabit, and interact through the use of avatars. Many VUs are represented using 3-D graphics and landscapes, and are populated by many thousands of users, known as residents. Other terms for VUs include metaverses and "3D Internet."

Users of a virtual universe conduct business and engage in social interactions based on the representation of their avatars and the interaction of the avatars with asset, environment, and other avatar data served from the VU's simulated environment. Virtual economies are emerging as the rate of business and social interactions within VUs is rapidly increasing.

SUMMARY

Embodiments include a method directed to determining that a trigger event occurs in a virtual universe. The trigger event is associated with one or more virtual universe objects. Data associated with an avatar that causes that causes the trigger event in the virtual universe is captured. An update for a data feed utilizing the captured data associated with the avatar is generated. The trigger event is associated with the data feed.

BRIEF DESCRIPTION OF THE SEVERAL DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to Really Simple Syndication (RSS), embodiments can be implemented with any current or future technology similar to RSS, such as the Atom Syndication Format. In other instances, well-known instruction instances, protocols, structures and techniques have not been shown in detail in order not to obfuscate the description.

Business transactions are becoming more prevalent in virtual universes. Functionality can be implemented within a VU to allow syndication of data feeds to subscribers outside the VU. Feeds collect and serve data from one or more VU objects and locations based on changes made to the VU either by the VU itself, or by avatars in the VU. A location in a virtual universe can be an area defined by at least three coordinates, as an example. Data feeds from a VU can be used to create a VU or non-VU application with and/or using the data feeds, to derive data from the data feeds, to monitor use of objects or space and billing for such use based on the data feeds, etc.

Figure 1:
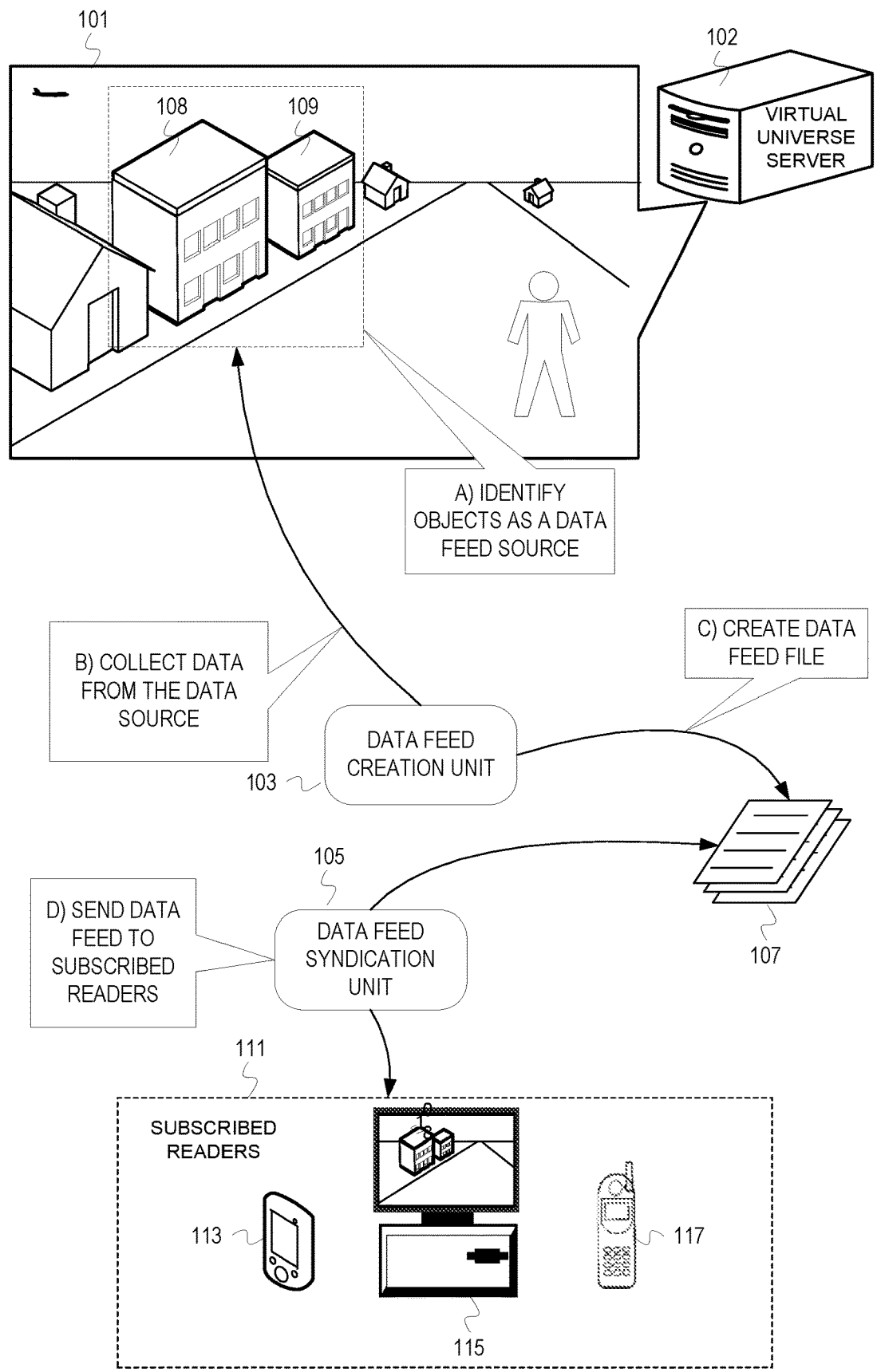
FIG. 1 depicts an example of data feed creation within a virtual universe.

FIG. 1 depicts an example of data feed creation within a virtual universe. A perspective 101 of a virtual universe is supported by a virtual universe server 102 and includes various graphical objects (e.g., buildings, avatars, vehicles, etc.) that make up the perspective 101. In FIG. 1, the perspective 101 comprises building graphical objects 108 and 109. In stage A, the building 108 and the building 109 are identified as a source for a data feed ("data feed source"). An object is identified as a data feed source when a user or program selects the object and chooses an option to make the object a data feed source.

At stage B, a data feed creation unit 103, collects data from the data feed source. Examples of collected data are graphical images, effects data, textures, coordinates, metadata, tracked usage, scripts, etc. As an example, data collected from buildings 108 and 109 may be statistical data (e.g., how many avatars passed by in a certain period of time, how many avatars entered one of the buildings, etc.), snapshots of avatars in the building, capture of the entire scene, etc.

At stage C, the data feed creation unit 103 creates a data feed 107 for syndication (e.g., using Really Simple Syndication (RSS)). As an example, the collected data may be formatted for syndication with data types separated into various fields (e.g., date and time formatted into a timestamp field, graphical images or metadata formatted into a description field, etc.).

At stage D, a data feed syndication unit 105 sends the data feed 107 to a set of subscribed readers 111. Although a push type syndication model is described, embodiments can implement a pull type syndication model or a hybrid of push and pull syndication The subscribed readers 111 are applications running on various devices, examples of which include a computer 115, a personal digital assistant (PDA) 113, and a mobile phone 117. A data feed reader running on computer 115 displays the data in the feed 107. The feed 107 may not contain data about all objects shown in the perspective 101. Five buildings are shown in the perspective 101. The buildings 108 and 109 are selected as the data source. The feed 107 contains data pertaining to the buildings 108 and 109, but not the other three buildings.

For example, the buildings 108 and 109 are listed for rent as storefronts by a property management company. The property management company identified the buildings 108 and 109 as a data feed to collect traffic data to show perspective tenants. The RSS feed 107 may include data such as how many avatars passed the buildings 108 and 109, demographics of passersby, images of passersby, etc.

Figure 2:
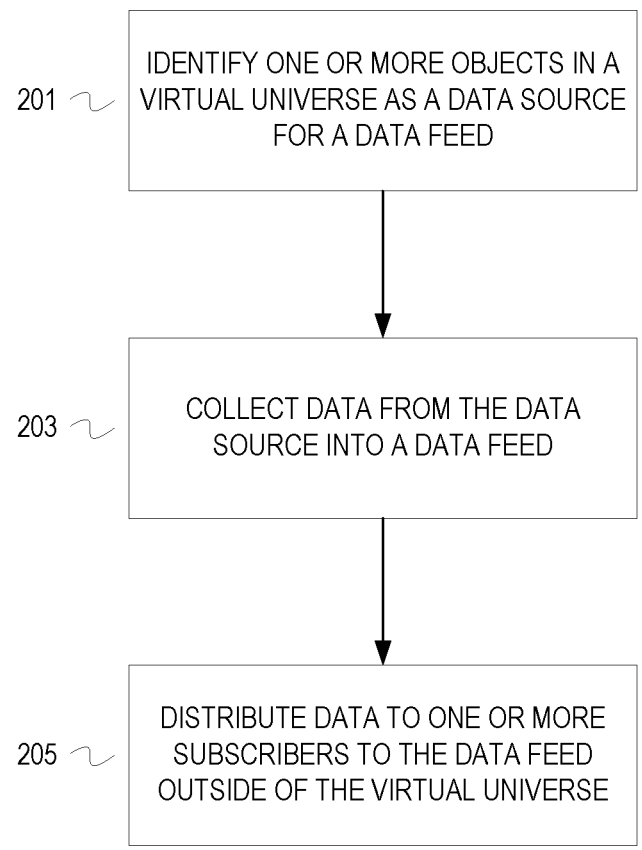
FIG. 2 depicts a flowchart of example operations for distributing a data feed to subscribers outside a VU.

FIG. 2 depicts a flowchart of example operations for distributing a data feed to subscribers outside a VU. Flow begins at block 201, where one or more objects in a VU are identified as a data source for a data feed. Examples of objects that can be used as data sources are buildings, avatars, vehicles, etc.

At block 203, data from the data source is collected into a data feed. An object indicated as a data source may contain one or more additional objects. Data is collected for each additional object contained within the data source object. Examples of objects that contain one or more additional objects include buildings, store product displays, etc.

At block 205, the data is distributed to one or more data feed subscribers outside of the virtual universe. In some embodiments, the data feed may be distributed at certain time intervals (e.g., daily). In other embodiments, the data feed may be a continuous stream of updates. In some embodiments, the data feed may be distributed to a subset of subscribers. The selection of these embodiments may be based on one or more conditions being met. For example, the default embodiment may be to distribute a data feed to all subscribers at an interval of 30 minutes, but a data feed containing a continuous stream of updates to a subset of subscribers (e.g., system administrators, authorities, object owners, etc.) may also be distributed.

Figure 3:
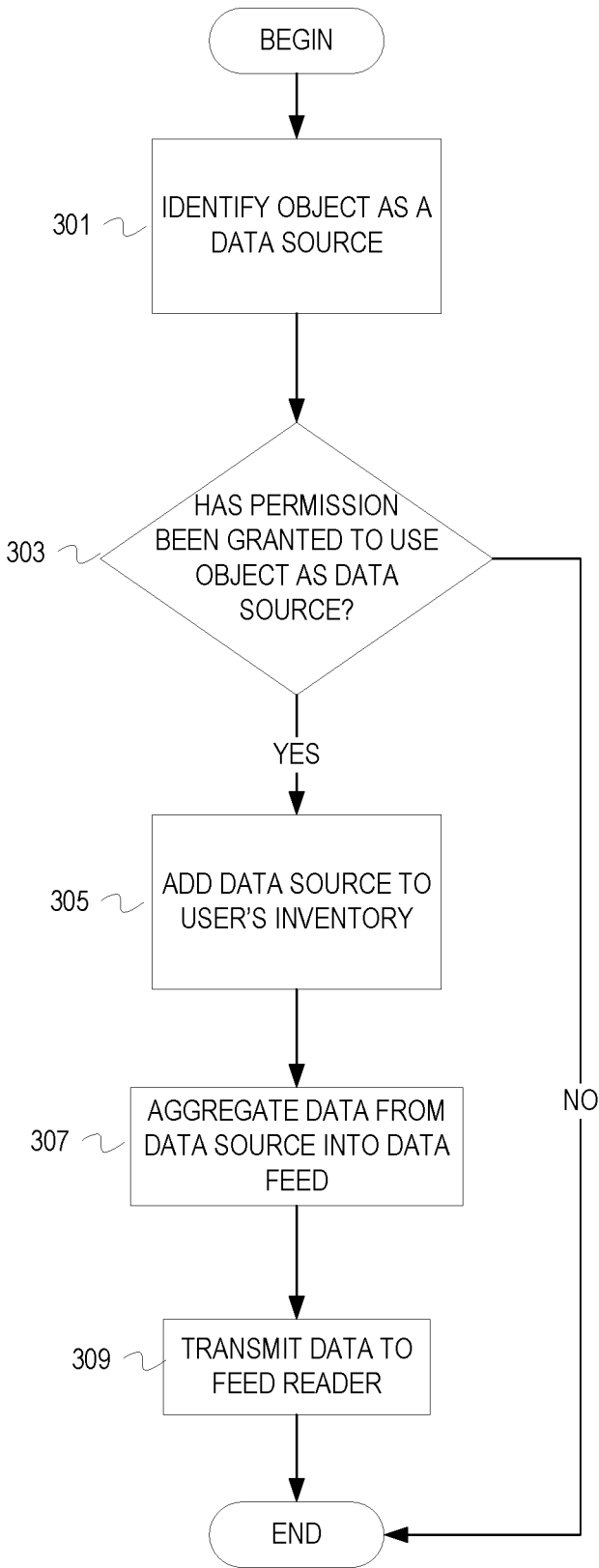
FIG. 3 is a flowchart depicting example operations for creating and transmitting a data feed from a virtual universe.

FIG. 3 is a flowchart depicting example operations for creating and transmitting a data feed from a virtual universe. Flow begins at block 301, where an object is identified as a data source. For example, a user selects an object and chooses an option to make the object a data source. As another example, a program selects an object based on a pattern match, such as a location visited by a threshold or percentage of avatars, an avatar engaging in sales above a threshold number or amount, etc. At block 303, it is determined if permission has been granted to use the object as a data source. In one example, a request for permission to use the object as a data source can be sent to an owner of the object which may include samples of data that may be syndicated. In another example, the owner of the object can set a permission configuration associated with the object. If permission is granted to use the object as a data source, flow continues at block 305. If permission is not granted to use the object as a data source, flow ends.

At block 305, the data source is added to an inventory associated with the user's avatar. The inventory is a set of assets that are available to the user within the virtual universe. The inventory may contain tangible items such as clothing and vehicles and intangible items such as scripts and images. While the data source resides in the user's inventory, the user is considered to be subscribed to a data feed associated with the data source.

At block 307, data from the data source is aggregated into a data feed.

At block 309, the data is transmitted to subscribed feed readers outside the virtual universe and flow ends.

Data feed transmission can occur at certain intervals (i.e., daily). As an example, a user maintains an account in several VUs to work as a marketing consultant for several client companies that run virtual retail outlets in the VUs. In order to avoid logging into several VUs every day, the consultant implements an RSS feed from each of the VU retail centers. The RSS feeds provide periodic scene aggregates to an RSS reader application that allows switching between retail centers for daily site tours of each virtual store. The consultant may also create data feeds that collect statistical data over time, such as number and amount of sales, number of avatars in the store, demographics of avatars in the store, etc. A feed may be created to derive graphical data representing correlations between statistical data and avatar activity over time. For example, a feed can contain plots of avatar traffic flow in the store over a day. The data can be analyzed to determine the most and least popular areas of the store, navigation problems within the store, etc.

Data feed transmission can occur continuously. For example, a company is interested in introducing a certain number of new customers to a VU per day. The company wishes to allow new users to tour the VU, but due to server load cannot instantiate each guest avatar into the VU interface, or due to a lack of user willingness to install the VU client in order to tour the VU. Instead, the company can allow potential users to subscribe to an RSS feed. An RSS scene aggregator application provided by the company can render scenes at specific locations in each region of the VU. The web feed scene aggregator can also provide data sufficient for a limited view of each region. To limit computing resources to display the scene data, a partial representation of the scene data for each region may be collected into the data feed. For example, collected scene data may be limited to a certain number of objects and/or avatars, avatars may be represented by low resolution shapes, objects and/or avatars may be represented by outlines instead of graphics, etc.

In some cases, a user may want to create a data source that transmits a data feed when certain parameters are met. Functionality can be implemented within a virtual universe to create a data feed when a trigger event occurs. The data feed may include data about the trigger event itself and/or about an avatar that caused the trigger. Triggered data feeds can be used to derive statistics, monitor use of objects and space and bill for such use, etc. In such cases, the user may be notified, such as via email, of the new data feed, as well as instructions on how to subscribe to it in their RSS reader or other client. Alternatively, users may be given individual feeds wherein additional feeds are distributed as separate categories of the user's feed as opposed to creating a separate feed.

Figure 4:
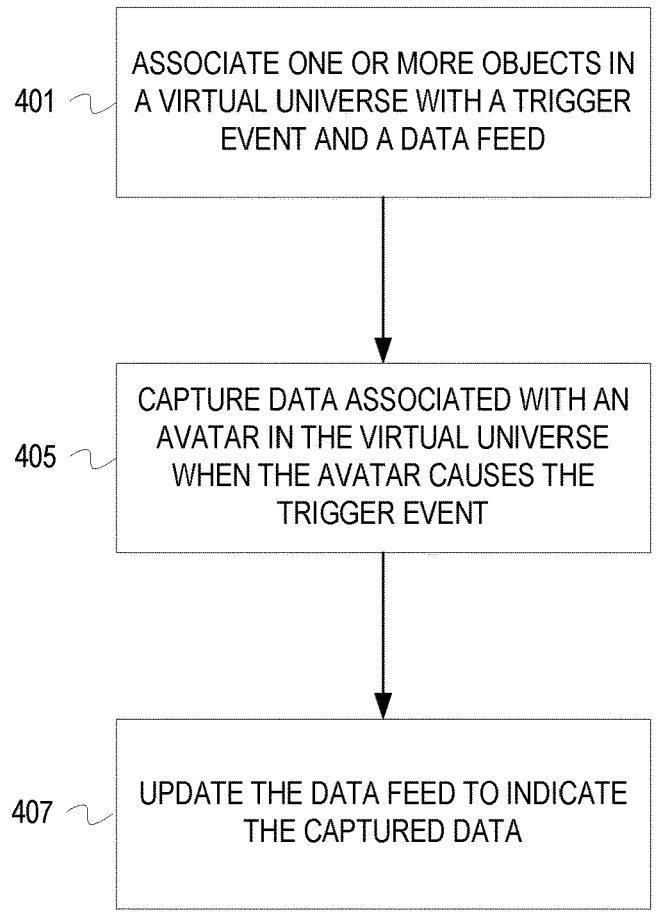
FIG. 4 is a flowchart depicting example operations for creating a triggered data feed.

FIG. 4 is a flowchart depicting example operations for creating a triggered data feed. At block 401, one or more objects in a virtual universe are associated with a trigger. A trigger event occurs when one or more indicated conditions associated with one or more objects have been met. Conditions are indicated by a user when the trigger event is created.

At block 403, the trigger event for a data feed is indicated. The data feed is indicated by the user after creating the trigger event.

At block 405, data associated with an avatar in the virtual universe that causes the trigger event is captured. Examples of data associated with an avatar include the avatar's name, the avatar's unique identifier, the email address of the avatar's owner, demographic data about the avatar and/or the user of the avatar, etc.

At block 407, the data feed is updated to indicate the captured data. The data feed may be transmitted to a feed reader, used to derive other data, aggregated into another data feed, etc. In addition, the data feed may be updated to literally indicate the captured data, to indicate data derived from the captured data, to indicate a modified version of the captured data, etc.

Figure 5:
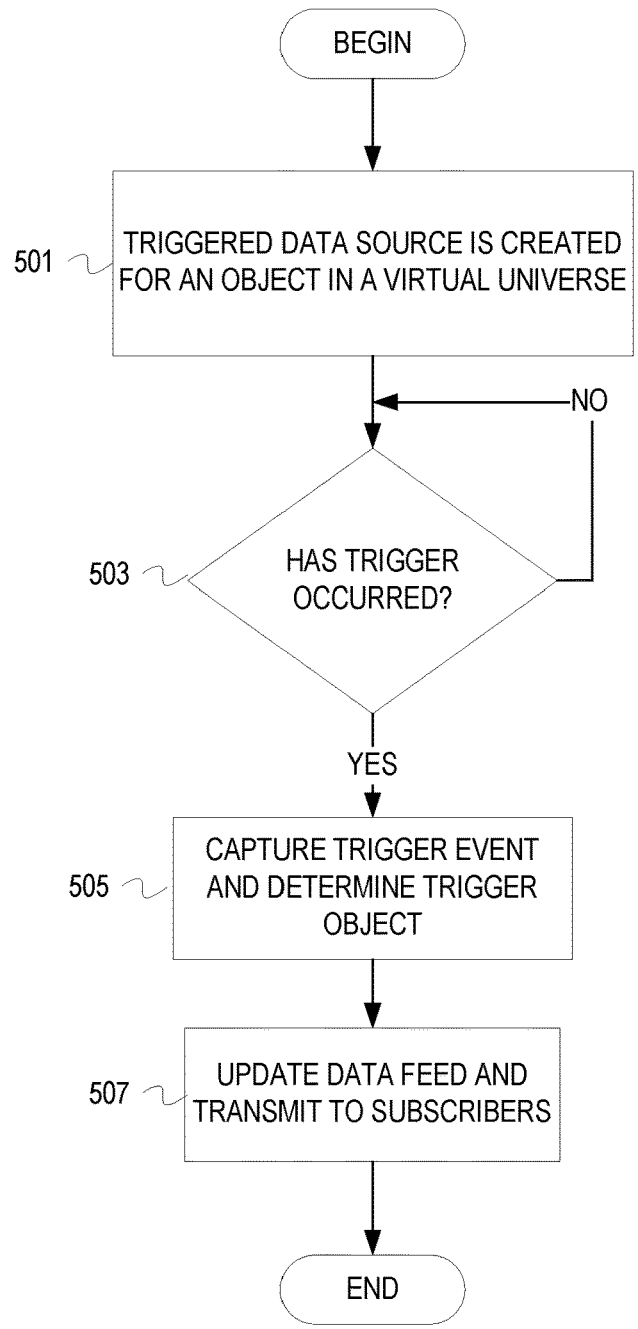
FIG. 5 is a flowchart depicting example operations for creating and distributing a triggered data feed.

FIG. 5 is a flowchart depicting example operations for creating and distributing a triggered data feed. Flow begins at block 501, where a data feed trigger event is defined in a virtual universe. At block 502, a data feed source is indicated for the data feed trigger event. For example, avatars, in general, are indicated as the data feed source for the trigger event. A data feed trigger event is defined by one or more conditions with one or more objects. The trigger event occurs when the one or more conditions have been satisfied. Example conditions include an avatar coming within a threshold distance from an object or location, an avatar picking up an object, an avatar entering a building, an avatar changing an attribute of an object, arrival of a particular time, etc. In addition, embodiments can implement nested dependent conditions. For instance, a trigger event can be defined with a first condition that a current time be within a given range and a second condition that a given number of avatars be within a threshold distance of at least two of five objects identified as a data feed source.

At block 503, it is determined if the trigger event has occurred. If the trigger event has occurred, flow continues at block 505. If the trigger event has not occurred, flow continues at block 503.

At block 505, data about an avatar causing the trigger event and/or data about the trigger event is captured. An example of a trigger event associated with a concert venue is an avatar crossing a boundary that defines the area of the concert venue. The condition is satisfied and the trigger event occurs when the avatar walks through a doorway of the venue. Data captured when the avatar entered the venue may include a time stamp of when the trigger event occurs, a unique identifier of the avatar, etc. Another example of condition is an avatar touching an interactive display in a museum. The condition is satisfied and the trigger event occurs when the avatar touches the display. Data captured may include the amount of time the avatar interacted with the display, the number of times the display was touched throughout the day, etc.

In addition, a trigger event for a data feed may have more than one condition. For example, a store owner may want to analyze the effectiveness of a product display. Conditions can be set up to detect an avatar stopping in front of the display, touching the display, picking up a product from the display, etc.

At block 507, the data feed is updated. Embodiments can accumulate data feed updates and update the data feed at certain intervals in batches, can update the data feed at every occurrence of a trigger event, etc. In addition, configurations can be set regarding the creation and transmission of data feeds for multiple objects and/or trigger events. For example, a user may wish to monitor trigger events for several different objects in a virtual universe. Each object may create an independent data feed. The user can set a configuration to receive the independent data feeds from each object or aggregate the independent feeds into one inclusive data feed.

Figure 6:
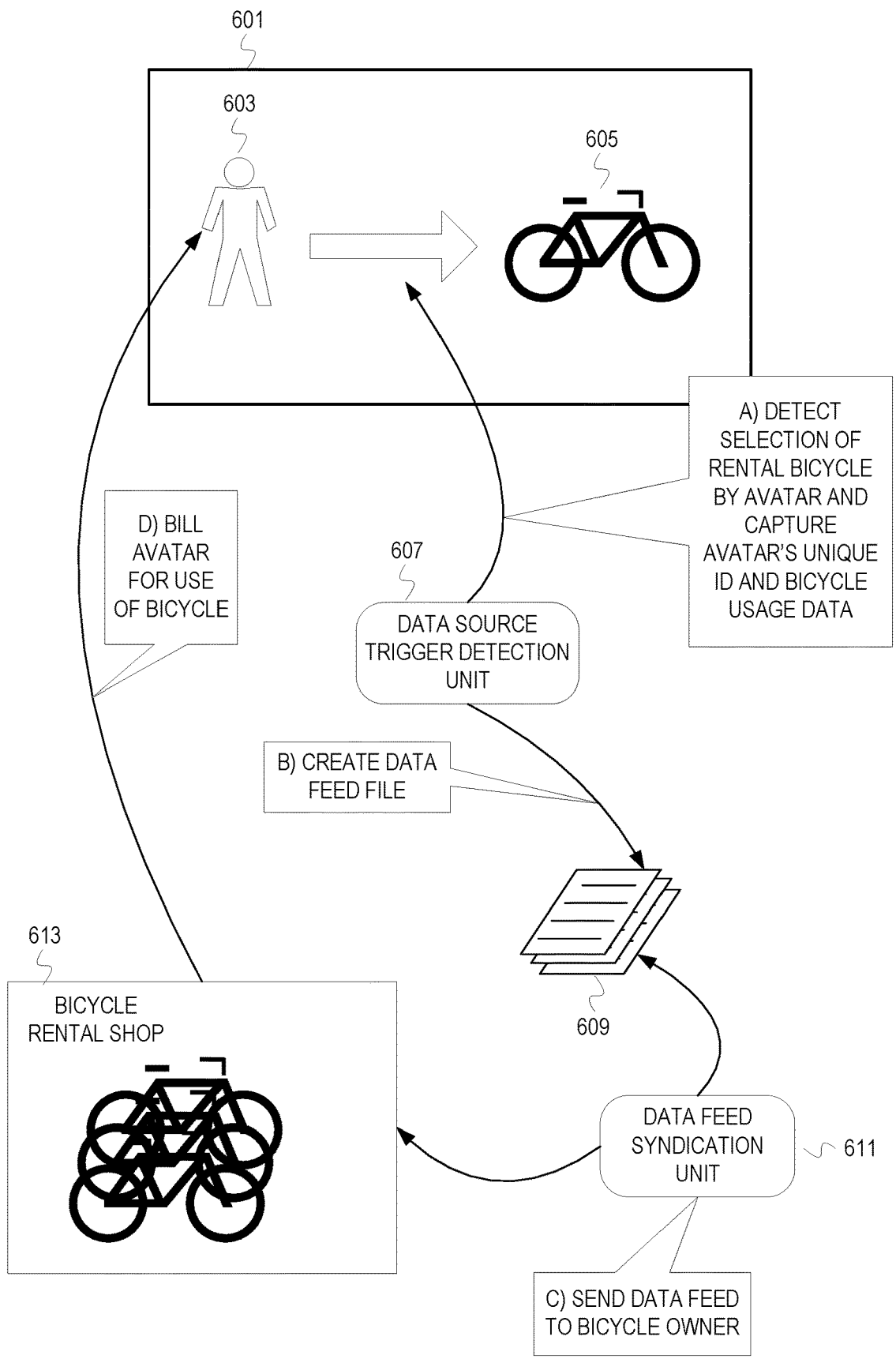
FIG. 6 depicts an example use of triggered data feeds in a virtual universe.

FIG. 6 depicts an example use of triggered data feeds in a virtual universe. An avatar 603 and a rental bicycle 605 exist within a virtual universe 601. The rental bicycle is an asset of a bicycle rental shop 613. At stage A, selection of the rental bicycle 605 by avatar 603 is detected by a data source trigger detection unit 607. The data source trigger detection unit 607 captures the unique identifier and bicycle usage data (e.g., model of bicycle chosen, how long the bicycle was used, distance traveled, a graphical map view of path traversed, etc.).

At stage B, a data feed file 609 is created by the data source trigger detection unit 607. At stage C, a data feed syndication unit 611 sends the data feed to the bicycle rental shop 613. In one example, the data feed is sent to an owner of the bicycle rental shop 613 via a feed reader outside the VU. In another example, the data feed is sent to a feed reader inside the VU that monitors use of the assets of the bicycle rental shop 613. Notifications may be sent to an avatar belonging to the owner through communication services in the VU (e.g., instant message, email, etc.) At stage D, the bicycle rental shop 613 uses the data to bill the avatar for use of the bicycle. In some embodiments, the billing may be an automated response to the trigger event in the data feed. In other embodiments, the billing may be manually initiated by the owner of the asset. The bicycle rental shop can conduct market research by setting up a data feed to accumulate data over a period of time to analyze popularity of certain models of bicycles, characteristics of avatars that rent bicycles, distances the bicycles are ridden, paths taken, etc.

Triggered data feeds can be used to reward users for certain behaviors in a VU. As an example, an avatar may be given a small amount of revenue for entering a park and being exposed to an advertisement. As another example, an avatar may be given a free song download for attending a concert and being one of the first 100 avatars to enter the venue.

In addition, triggered data feeds can be used to monitor the use of spaces by avatars and charge owners of the avatars for use. A space is defined as an area within specific boundaries in the virtual universe. For example, an owner of a convention center in a virtual universe can define a space that is part of the convention center. The owner can monitor avatar activity within the space such as time spent in the space, corporate booths visited in the space, number of avatars in the space, etc.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 3, permission to use an object as a data source may not be implemented in certain embodiments because all objects within some VU may be used as a data source by default. In addition, with reference to FIG. 4, a data feed may be conditioned upon multiple triggers. Additional operations may be performed to determine if additional trigger parameters have been met and/or a given time period has elapsed since the initial trigger.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Computer program code for carrying out operations of the embodiments may be written in any combination of one or more programming languages, including an object oriented programming language such as Java™, Smalltalk™, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
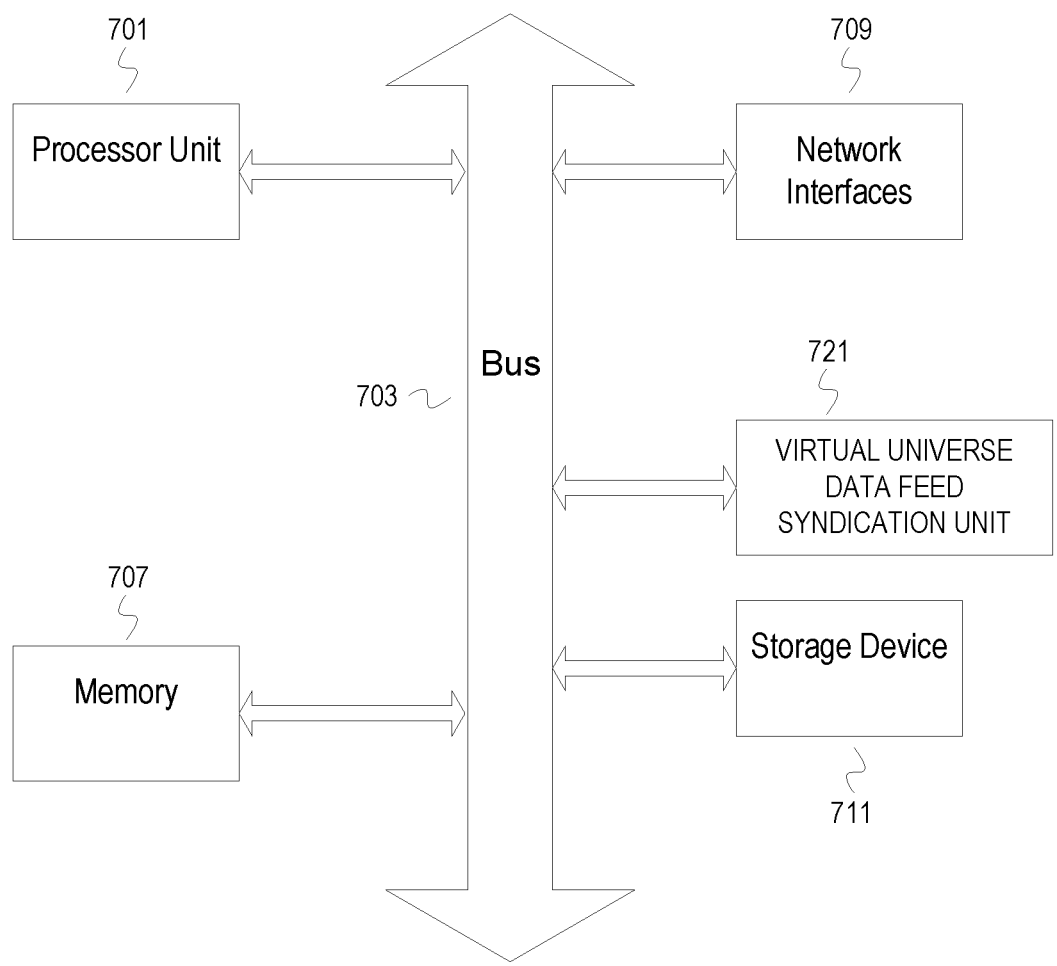
FIG. 7 depicts an example computer system.

FIG. 7 depicts an example computer system. A computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport®, InfiniBand®, NuBus®, etc.), a network interface 709 (e.g., an ATM interface, an Ethernet interface, a Frame Relay interface, SONET interface, wireless interface, etc.), and a storage device(s) 711 (e.g., optical storage, magnetic storage, etc.). A virtual universe data feed syndication unit 721 performs the functionalities described herein. For instance, the virtual universe data feed syndication unit 721 can aggregate objects as a data source, collect data from the data source into a data feed, and transmit the data feed to subscribers. Any one of these functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 711, and the network interface 709 are coupled to the bus 703. Although illustrated as being coupled to the bus 703, the memory 707 may be coupled to the processor unit 701.

While the embodiments are described with reference to various implementations and exploitations, it will be understood that these embodiments are illustrative and that the scope of the inventive subject matter is not limited to them. In general, techniques as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for data collection in a virtual universe, the method comprising:
    selecting a first virtual universe object as a data source based on pattern matching of avatars interacting with the first virtual object above a threshold amount;
    determining, by a server, the first virtual universe object is associated with a first data feed;
    aggregating data of the data source and scene data configured to render scenes of locations within the virtual universe, into the first data feed;
    determining a first trigger event associated with the first data feed, wherein the first trigger event includes an avatar conducting a business transaction relating to the first virtual universe object and moving within a threshold distance of the first virtual universe object;
    determining permission has been granted to access the first data feed;
    in response to determining permission has been granted to access the first data feed:
        capturing first data from the first data feed in response to the first trigger event;
        transmitting the first data to a user device associated with an owner of the first virtual universe object; and
    syndicating the first data feed to subscribers outside of the virtual universe by collecting and serving the data from the first data source and the rendered scenes of the locations in the virtual universe to subscribed feed readers outside of the virtual universe using a web feed scene aggregator to display data of the first data source and rendered scenes of the locations of the virtual universe to the subscribed feed readers.

2. The method of claim 1, wherein the first virtual universe object comprises a virtual product.

3. The method of claim 1, wherein the user device is outside the virtual universe.

4. The method of claim 1, further comprising:
    determining to capture second data from the first data feed in response to a second virtual universe object performing a second trigger event;
    determining statistical data related to the first data and the second data; and
    transmitting the statistical data to the user device.

5. The method of claim 1, further comprising:
    determining to capture second data from a second data feed in response to the avatar moving within the threshold distance of the first virtual universe object;
    determining to create a data feed file comprising the first data and the second data; and
    transmitting the data feed file to the user device.

6. The method of claim 1, further comprising:
    determining not to access the first data feed in response to determining permission has not been granted to access the first data feed.

7. A computer comprising:
    a memory; and one or more processors;
one or more non-transitory machine-readable media including instructions which, when executed by at least one of the one or more processors, cause the processor to perform operations for controlling data feeds in a virtual universe, the instructions including
instructions to select a first virtual universe object as a data source based on pattern matching of avatars interacting with the first virtual object above a threshold amount;
instructions to determine the first data feed is associated with a first object in the virtual universe;
instructions to aggregate data of the data source and scene data configured to render scenes of locations within the virtual universe, into the first data feed;
in response to determining permission to access the first data feed has been granted by an owner of the first object:
  instructions to determine to capture first data from the first data feed in response to an avatar moving within a threshold distance of the first object, wherein the first data indicates a business transaction in the virtual universe;
  instructions to determine to transmit the first data to a user device associated with the owner of the first virtual universe object; and
  instructions to syndicate the first data feed to subscribers outside of the virtual universe by collecting and serving the data from the first data source and the rendered scenes of the locations in the virtual universe to subscribed feed readers outside of the virtual universe using a web feed scene aggregator to display data of the first data source and rendered scenes of the locations of the virtual universe to the subscribed feed readers.

8. The computer of claim 7, wherein the first object comprises a virtual product.

9. The computer of claim 7, wherein the user device is outside the virtual universe.

10. The computer of claim 7, wherein the instructions further include:
  instructions to capture second data from the first data feed in response to a second object in the virtual universe performing a second trigger event;
  instructions to determine statistical data related to the first data and the second data; and
  instructions to transmit the statistical data to the user device.

11. The computer of claim 7, wherein the instructions further include:
  instructions to capture second data from a second data feed in response to the avatar moving within the threshold distance of the first virtual universe object;
  instructions to determine to create a data feed file comprising an aggregate of the first data and the second data; and
  instructions to transmit the data feed file to the user device.

12. The computer of claim 7, wherein the instructions further include:
  instructions to determine not to access the first data feed in response to determining permission has not been granted to access the first data feed.

13. A computer program product for data collection in a virtual universe, the computer program product comprising a non-transitory computer readable storage medium having program instructions embodied therewith, the program instructions including:
  instructions to select a first virtual universe object as a data source based on pattern matching of avatars interacting with the first virtual object above a threshold amount;
  instructions to determine the first virtual universe object in a virtual universe is associated with a first data feed;
  instructions to aggregate data of the data source and scene data configured to render scenes of locations within the virtual universe, into the first data feed;
  instructions to determine a first trigger event associated with the first data feed, wherein the first trigger event includes an avatar moving within a threshold distance of the first virtual universe object;
  instructions to determine permission has been granted to access the first data feed; instructions to in response to determining permission has been granted to access the first data feed:
    capture first data from the first data feed in response to the avatar moving within the threshold distance of the first virtual universe object;
    instructions to transmit the first data to a user device associated with an owner of the first virtual universe object; and
  instructions to syndicate the first data feed to subscribers outside of the virtual universe by collecting and serving the data from the first data source and the rendered scenes of the locations in the virtual universe to subscribed feed readers outside of the virtual universe using a web feed scene aggregator to display data of the first data source and rendered scenes of the locations of the virtual universe to the subscribed feed readers.

14. The computer program product of claim 13, wherein the first virtual universe object comprises a virtual product.

15. The computer program product of claim 13, wherein the user device is outside the virtual universe.

16. The computer program product of claim 13, wherein the program instructions further including:
  instructions to capture second data from the first data feed in response to a second virtual universe object performing a second trigger event;
  determine statistical data related to the first data and the second data; and
  instructions to transmit to the user device the statistical data and the second data.

17. The computer program product of claim 13, wherein the program instructions further include:
  instructions to capture second data from a second data feed in response to the avatar moving within the threshold distance of the first virtual universe object;
  instructions to determine to create a second data feed file comprising the first data and the second data; and
  instructions to transmit the second data feed file to the user device.

18. The computer program product of claim 13, wherein the program instructions further include:
  instructions to determine not to access the first data feed in response to determining permission has not been granted to access the first data feed.

* * * * *